US009795195B2

(12) United States Patent
Martinson et al.

(10) Patent No.: US 9,795,195 B2
(45) Date of Patent: Oct. 24, 2017

(54) SYSTEMS AND METHODS FOR A MULTI-MATERIAL EXTRUDED ZIPPER

(71) Applicant: SUBZIPPER, INC., Rogers, MN (US)

(72) Inventors: Daniel J. Martinson, Medina, MN (US); Kent Harrison Brightman, Bethany Beach, DE (US)

(73) Assignee: Nite Ize, Inc., Boulder, CO (US)

( * ) Notice: Subject to any disclaimer, the term of this patent is extended or adjusted under 35 U.S.C. 154(b) by 84 days.

(21) Appl. No.: 14/762,761

(22) PCT Filed: Jan. 22, 2014

(86) PCT No.: PCT/US2014/012574
§ 371 (c)(1),
(2) Date: Jul. 22, 2015

(87) PCT Pub. No.: WO2014/116720
PCT Pub. Date: Jul. 31, 2014

(65) Prior Publication Data
US 2015/0374074 A1    Dec. 31, 2015

Related U.S. Application Data

(60) Provisional application No. 61/756,539, filed on Jan. 25, 2013.

(51) Int. Cl.
A44B 19/16    (2006.01)
A44B 19/26    (2006.01)
A44B 19/42    (2006.01)
B29D 5/10    (2006.01)

(52) U.S. Cl.
CPC ............ *A44B 19/16* (2013.01); *A44B 19/267* (2013.01); *A44B 19/42* (2013.01); *B29D 5/10* (2013.01); *Y10T 24/2534* (2015.01)

(58) Field of Classification Search
CPC ....... A44B 19/16; A44B 19/42; A44B 19/267; Y10T 24/2534; Y10T 24/2532; B29D 5/10
See application file for complete search history.

(56) References Cited

U.S. PATENT DOCUMENTS

| 3,440,696 A * | 4/1969 | Staller ................. B29C 47/128 24/586.1 |
|---|---|---|
| 5,267,846 A | 12/1993 | Miyama et al. |
| 5,351,369 A | 10/1994 | Swain |
| 5,636,415 A | 6/1997 | James |
| 2001/0013277 A1 | 8/2001 | Galkiewicz et al. |
| 2009/0211852 A1 | 8/2009 | Hannon et al. |

(Continued)

OTHER PUBLICATIONS

International Search Report in co-pending PCT Application No. PCT/US2014/012574 dated Jun. 4, 2014.

*Primary Examiner* — Robert J Sandy
*Assistant Examiner* — Michael Lee
(74) *Attorney, Agent, or Firm* — Haynes and Boone, LLP

(57) ABSTRACT

A zipper includes a ball portion. The zipper portion further includes a socket portion. The ball portion includes a leading edge, the leading edge composed of a first material having a low coefficient of friction. The ball portion includes a trailing edge and a neck portion, the trailing edge and neck portion composed of a second material. The socket includes a socket opening, the socket opening composed of the first material. The socket includes a socket interior, the socket interior composed of the second material.

11 Claims, 5 Drawing Sheets

(56) References Cited

U.S. PATENT DOCUMENTS

2009/0265898 A1 10/2009 Ackerman et al.
2009/0307880 A1 12/2009 Brightman
2010/0175230 A1 7/2010 Kelsey et al.

* cited by examiner

SYSTEMS AND METHODS FOR A MULTI-MATERIAL EXTRUDED ZIPPER

CROSS-REFERENCE TO RELATED APPLICATIONS

This application is a National Stage of PCT Application No. PCT/US2014/012574 filed on Jan. 22, 2014, which PCT application claims the benefit of U.S. Provisional Application No. 61/756,539 filed Jan. 25, 2013. The above PCT and provisional patent applications are hereby incorporated by reference to the same extent as though fully contained herein.

BACKGROUND

Most, if not all, polymer zipper systems are made from Olefin-based polymers like polypropylene or polyethylene. Polymer zipper profiles are manufactured using an extrusion process. Olefin-based systems are prevalent in many polymer zipper systems due to the inherent low cost of the polymer resin and its low coefficient of friction properties. A low coefficient of friction is important so that the ball and socket of the zipper can be pushed together with minimal effort. However, Olefin-based zipper systems have their limitations. Most Olefin zipper systems made from polypropylene and polyethylene are not durable when used in exterior environments where temperature extremes affect the performance of the material. Polypropylene and polyethylene zipper profiles lack tensile and tear strength and good elongation properties. They also have excessive compression set when exposed to stress loads at higher temperatures. Therefore, they are not used for extreme applications such as "drybags" and "wet-suits" that are often used in hot environments. Rather, they are used for sandwich bags and other low performance applications.

SUMMARY

In one embodiment, a zipper includes a ball portion. The zipper portion further includes a socket portion. The ball portion includes a leading edge, the leading edge composed of a first material having a low coefficient of friction. The ball portion includes a trailing edge and a neck portion, the trailing edge and neck portion composed of a second material. The socket includes a socket opening, the socket opening composed of the first material. The socket includes a socket interior, the socket interior composed of the second material. Optionally, the first and second materials are co-extruded. In one alternative, the zipper further includes a first zipper slide support and a second zipper slide support, the first and second zipper slide supports interconnected with the ball portion and socket portion, respectively, a first body and a second body of the first and second zipper slide supports, respectively, composed of the second material, with a first slide section of the first zipper slide support composed of the first material and a second slide section of the second zipper slide support composed of the first material. Optionally, the zipper includes a first flange portion and a second flange portion, the first and second flange portions interconnected with the first and second zipper slide supports, respectively, the first and second flange portions composed of a third material. In another alternative, the durometer of the second material is higher than the durometer of the first and third materials. Optionally, the durometer of the first material is higher than the durometer of the third material. In another alternative, the first, second, and third materials are Thermoplastic Urethane. Optionally, the first material has a durometer of 74 shore D. Alternatively, the second material has a durometer of 95 shore A. Optionally, the third material has a durometer of 75 shore A. Alternatively, the first, second, and third materials are extruded together as part of a tri-extrusion process; and the first, second, and third materials bond together during the extrusion process as a result of being composed of the sample base thermoplastic. Optionally, the zipper further includes a slide, the slide oriented on the first and second zipper slide supports, the slide operable to close the zipper.

In one embodiment, a method of forming a zipper includes extruding, as part of a tri-extrusion process, a first material, the first material forming a leading edge of a ball portion of the zipper and the first material forming an opening for a socket. The method further includes extruding, as part of the tri-extrusion process, a second material, the second material forming a trailing edge and a neck portion of the ball portion and the second material forming a socket interior of the socket. Optionally, the first material further forms a first slide section of a first zipper slide support and a second slide section of a second zipper slide support and the second material further forms a first body and a second body of the first and second zipper slide supports, respectively, and the first and second zipper slide supports are interconnected with the ball portion and socket portion. Alternatively, the method includes extruding a third material, the third material forming a first flange portion and a second flange portion, the first and second flange portions interconnected with the first and second zipper slide supports, respectively. Optionally, the durometer of the second material is higher than the durometer of the first and third materials. Alternatively, the durometer of the first material is higher than the durometer of the third material. Optionally, the first, second, and third materials are Thermoplastic Urethane. Alternatively, the first material has a durometer of 74 shore D. Optionally, the second material has a durometer of 95 shore A. Alternatively, the third material has a durometer of 75 shore A. Optionally, the first, second, and third materials are extruded together as part of a tri-extrusion process; and the first, second, and third materials bond together during the extrusion process since they are composed of the sample base thermoplastic. Optionally, the method further includes providing a slide, the slide oriented on the first and second zipper slide supports, the slide operable to close the zipper.

DETAILED DESCRIPTION OF THE DRAWINGS

Described herein are embodiments of a multi-material extruded zipper (MMEZ) and methods of using it and making it. Essentially, it is advantageous for various parts of the MMEZ to be composed of multiple pieces of thermoplastic that are extruded together, where the multiple pieces of thermoplastic have different characteristics, such as different tensile strength, different elongation properties, and different durometers.

The MMEZ is made from a Thermoplastic Urethane (TPU) material. Unlike Olefin-based plastics, TPUs are crosslinked polymer elastomers that exhibit rubber-like properties at high and low durometers. TPU polymers exhibit extremely high tensile and tear strengths and high elongation properties at high and low temperature extremes. TPU polymers also exhibit superior compression set resistance. TPU polymers are designed for use in extreme outdoor applications.

Unlike polypropylene and polyethylene, TPU does not have a low coefficient of friction (LCOF). Therefore, polymer zipper systems made from TPU need a frequent application of a "wiped-on" lubricant to allow the ball and socket of the zipper to easily seat together (shown as 1a and 1b in FIG. 1). Unfortunately, the "wiped-on" lubricant wears off in a short period of time. Our invention addresses this deficiency.

Essentially, the MMEZ is extruded such that areas that require low friction surfaces are extruded to be composed of LCOF material, and materials that require flexibility and high strength are composed of TPU materials.

Figure 1:
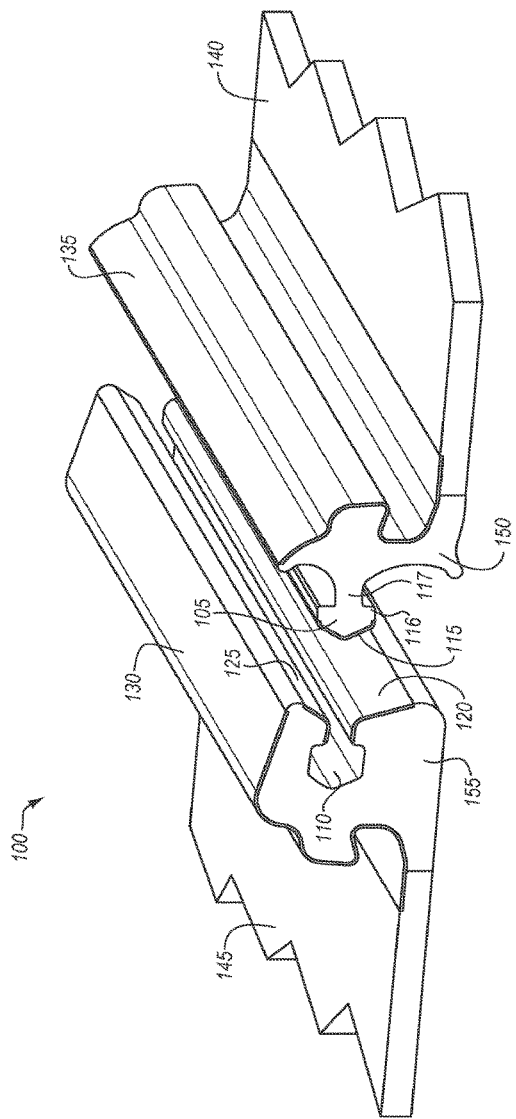
FIG. 1 shows one embodiment of a multi-material extruded zipper (MMEZ)

FIG. 1 shows an embodiment of an MMEZ 100. MMEZ 100 includes a socket 110 for receiving ball 105. Ball 105 includes a leading edge 115 of an LCOF coating that has been extruded as part of the tri-extrusion process. Trailing edge 116 and neck 117 of ball 105 are composed of a softer TPU material as is described herein below. Socket 110 includes top and bottom socket openings 120, 125 where an LCOF coating has been extruded. The interior of socket 110 is formed of a similar material to the trailing edge 116 and neck 117, generally a softer TPU material than the LCOF coating. The remainder of the body of the zipper 100 is formed of slide supports 150 and 155, which are formed of the softer TPU material than the neck 117 of ball 105 is formed. Portions of the slide supports 150, 155 are similarly coated with an LCOF during the extrusion process. Slide supports 150, 155 include first and second slide sections 130, 135 that are composed of an LCOF coating formed during the extrusion process. Zipper 100 further includes flanges 140, 145 on either side of the slide supports 150, 155. Flanges 140, 145 are composed of a TPU material as well. Generally, this material is softer than the LCOF coating. It may also be softer than the TPU material used to make up the slide supports 150, 155.

Note that generally the slide support and the non-LCOF-coated areas of the ball and socket are formed together as a single part. Generally, the zipper 100 may be thought of as including a ball and socket portion including a slide support formed of a first material, an LCOF coating of a second material on low friction areas of the zipper 100, and a flange on either side of the zipper 100 of a third material. All three materials are extruded together using a tri-extrusion manufacturing process. Because each of the materials are TPU-based, they bond together in the extrusion process. Each of the materials exhibit different properties based on their chemical makeup. The first material that forms the ball and socket (and slide support) are made from a 95 shore A durometer TPU. The LCOF coating of the second material is made from a much harder 74 shore D durometer TPU with an LCOF additive. The RF Welding Flanges 140, 145 are made of a softer 75 shore A durometer TPU. Three different materials to accomplish three separate characteristics required in the end product assembly allow the zipper to function correctly. In alternatives, only two materials may be used, a first harder material having an LCOF additive, and a softer material for the ball and socket and flanges. Alternatively, more than three materials may be used and portions of the slide supports may be made harder than the neck and trailing edge of the ball, while still using the other three materials described above. Multiple alternatives will be apparent to those skilled in the art in light of this disclosure.

Figure 2A:
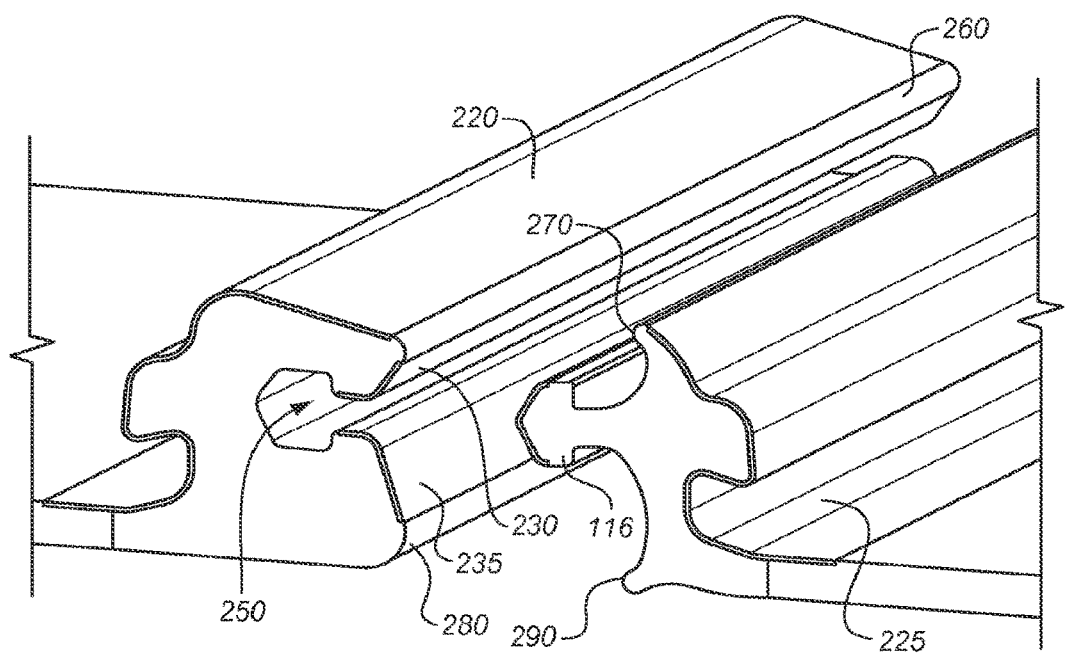
FIG. 2a shows another view of the MMEZ of FIG. 1.
Figure 2B:
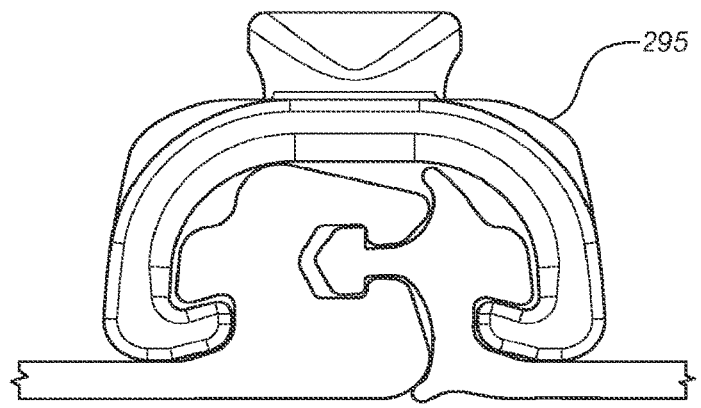
FIG. 2b shows the MMEZ of FIG. 1 including a slider.

The LCOF TPU that we use for the areas 220, 225, 230, 235 in FIG. 2a prevents the need for added liquid lubrication that must be applied on a frequent basis in order for TPU zippers to function properly. So, in relation to the ball and socket function, the usage of LCOF TPU solves two issues. First, the LCOF coating may be applied in strategic spots on the extrusion profile. As shown, the LCOF coating may be applied to the leading edges 115 of the ball 105 and the socket openings 120, 125 of the socket. This allows the ball and socket to seat together with minimal "insertion" effort. However, the interior 250 of socket 110 and trailing edge 116 are not coated to allow for a difficult extraction force. This makes it more difficult to pull the ball and socket apart. As mentioned before, TPU has a very high coefficient of friction. When the ball and socket seat together, the specific areas where we do not coat the extruded profile with the LCOF TPU are relied upon to keep the zipper ball and socket seated. Therefore, we have accomplished an easy insertion and difficult extraction characteristic by strategically coating the ball and socket profile. Further note that the LCOF coating does not wear off and does not need to be reapplied. This is considered to be a significant advantage over prior systems that require re-lubrication of certain surfaces. When a liquid LCOF coating is applied not in the context of an extrusion process, it is difficult to strategically place the coating. The liquid LCOF coating applied after extrusion tends to coat every surface on the profile as it "flows" into position. Therefore, the extraction force with the liquid LCOF coating is much less. FIG. 2b shows the addition of slider 295 for use in closing the zipper assembly.

Figure 3:
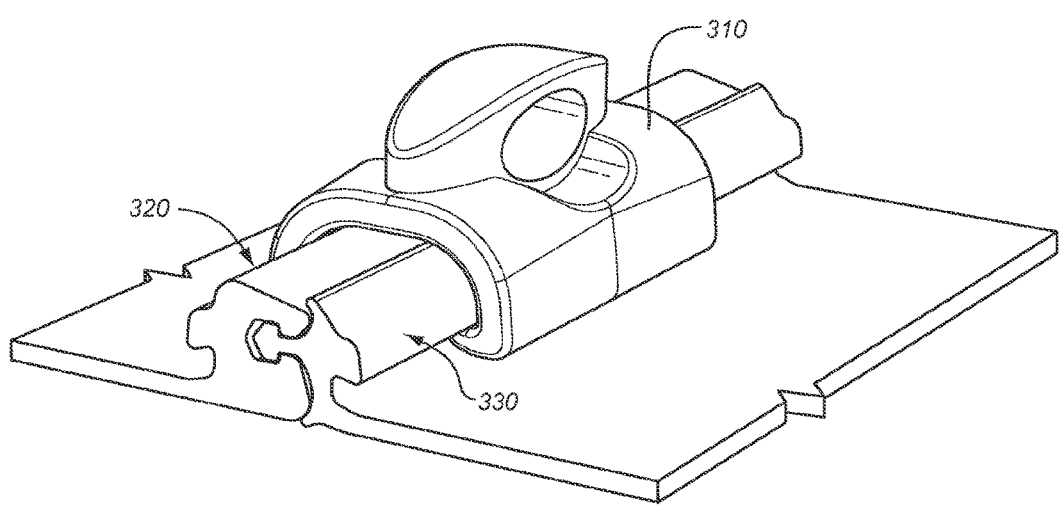
FIG. 3 shows a perspective view of the MMEZ of FIG. 1 including a slider.

Second, as seen in FIG. 3, our MMEZ system relies on a "slider" mechanism 310 to combine the left and right sides 320, 330 of the zipper assembly. When the slider is moved along the extruded profiles during assembly, there is interference between the slider and the zipper profiles. Without an LCOF coating, the slider will not move. Therefore, we apply the LCOF coating during extrusion to slide sections 130, 135 in FIG. 1. Having the LCOF coating in these areas allows the slider to function with minimal effort.

Certain areas purposefully do not have the LCOF coating to the areas pointed. Sealing areas 260, 270, 280, 290 need to be more flexible in order to create a proper seal. This is the reason two different materials are used for the main body of the zipper 100 that contains the ball 105 and socket 110. In order for the zipper to properly seal and allow for flexibility in final use, the durometer cannot be above 95 to 100 shore A. At durometers above 100 shore A, it would be too difficult to combine the zipper assembly in normal operation. Therefore, our solution allows us to strategically place a harder LCOF material coating where needed without affecting the function of the zipper assembly.

Figure 4A:
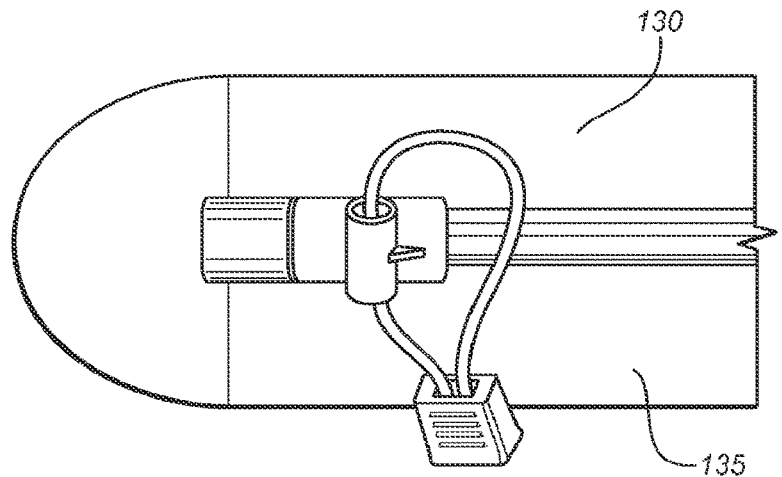
FIG. 4a shows the MMEZ of FIG. 1.
Figure 4B:
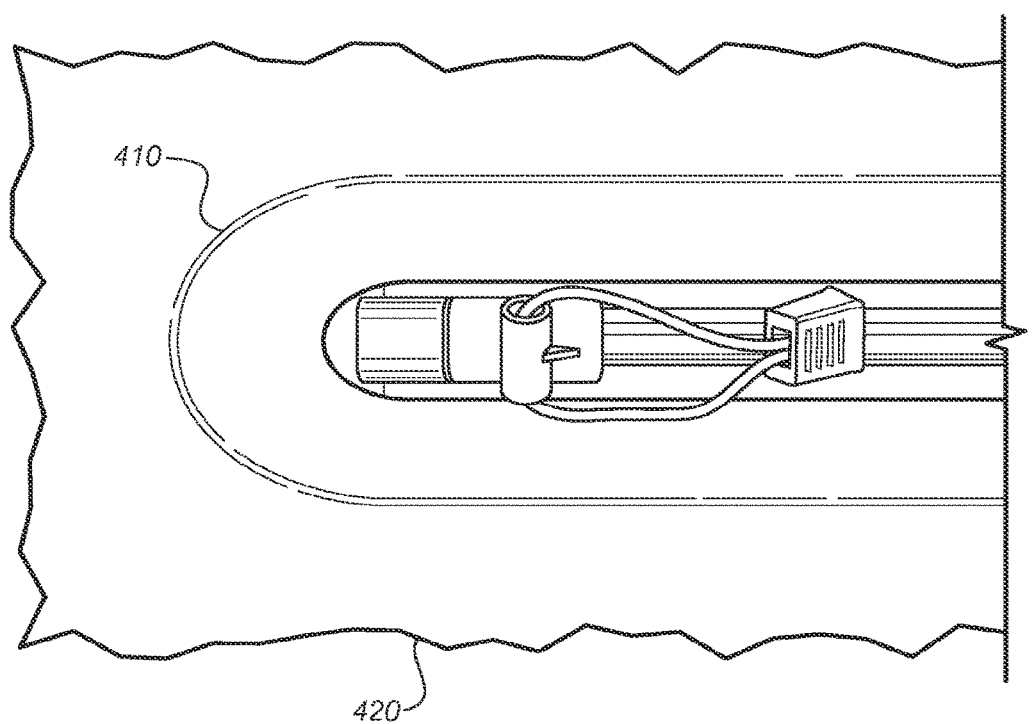
FIG. 4b shows the MMEZ of FIG. 1 welded into a bag.
Figure 5:
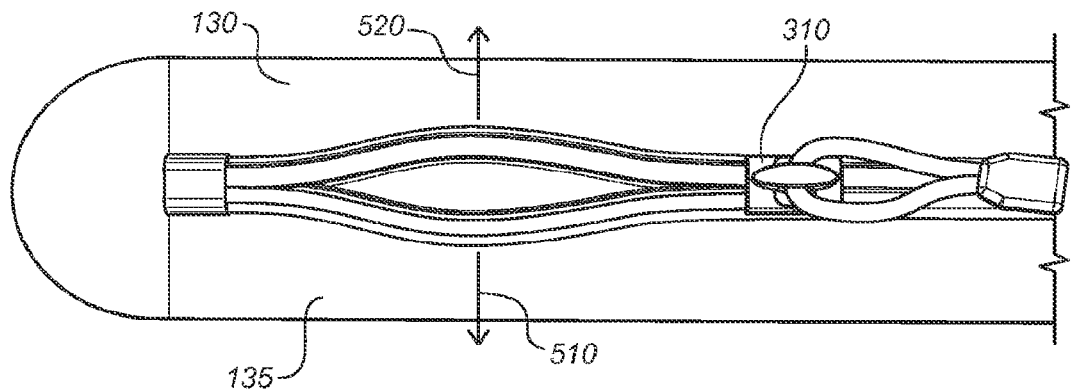
FIG. 5 shows a version of the MMEZ of FIG. 1 with a stiffer flange material.

FIG. 4a shows flanges 130, 135, which may be referred to as "RF Welding Flanges." MMEZ 100 is designed for use in drybag assemblies, waders, jacket pockets, and other waterproof and water-resistant applications. In order to assemble our MMEZ 100 to the end product, it must be sealed in the assembly. Radio Frequency (RF) welding is used to melt the TPU zipper to the end product. As a note, Olefin-based polymers do not respond to RF welding. Therefore, a TPU-based zipper is required for this application. However, we have determined that a TPU harder than 75 shore A may be too stiff for use in the flanges 130, 135 for this application. MMEZ 100 may work at harder durometers; however, the operation will be difficult and less desirable. When assembled to a thin jacket fabric, the flange makes a pronounced impression 410 in the jacket 420 as shown in FIG. 4b, which is not desired by the manufacturer or user. By extruding a softer durometer TPU, such as 75 shore A, in this area, it allows the RF Welding Flanges to "drape" with the fabric and not show as prominently through the fabric. A lower durometer TPU is also used in the RF Welding Flanges for a second purpose. As shown in FIG. 5, MMEZ 100 slider 310 opens the ball and socket by splitting them in the directions 510, 520. The resistance of slider 310 is reduced as the durometer of the RF Welding Flanges 130, 135 is lowered. The lower the durometer, the easier it is for the flanges 130, 135 to deflect/deform, providing less resistance to the slider. It also has another effect on the assembly. When the ball and socket profile are able to open at a greater angle, the slider can be shorter from front to back in length. The slider then requires less "lead-in" for the splitter post that opens the zipper.

Figure 6A:
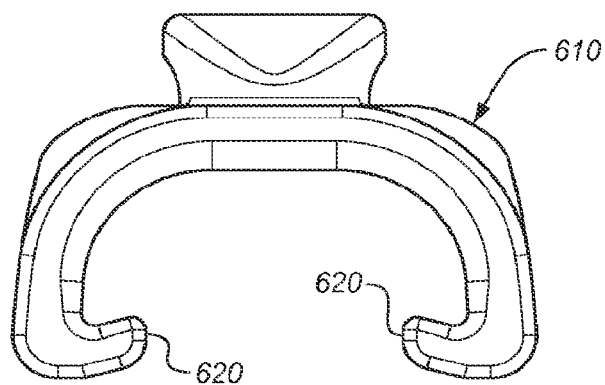
FIGS. 6a and 6b show an exemplary slider to be used with the MMEZ of FIG. 1.
Figure 6B:
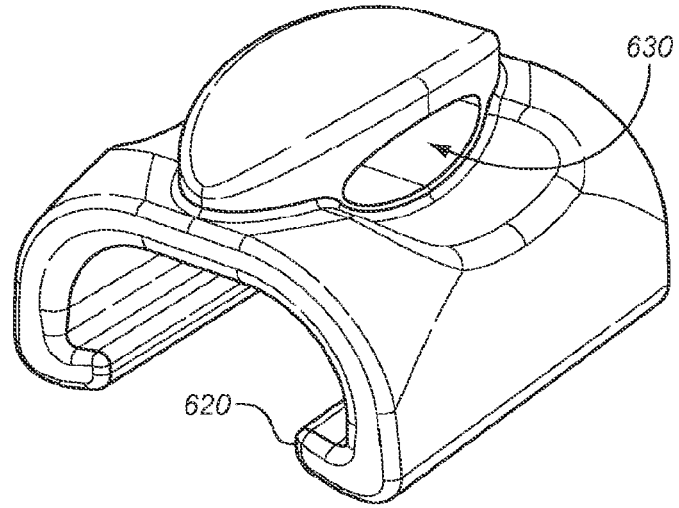

FIGS. 6a and 6b show an exemplary slider to be used with the MMEZ. The slider includes upper slider body 610 and track holders 620 and pull receiver 630. Track holders 620 fit into area 22 shown in FIG. 2a. The slide shown is merely an exemplary slide and various options will occur to those skilled in the art in light of this disclosure.

The previous detailed description is of a small number of embodiments for implementing the systems and methods for creating a multi-material extruded zipper (MMEZ) and the systems of MMEZs and is not intended to be limiting in scope. The following claims set forth a number of the embodiments of the systems and methods for creating MMEZs and the systems of MMEZs disclosed with greater particularity.

The invention claimed is:

1. A zipper comprising:
   a ball portion;
   a socket portion, wherein the ball portion includes a leading edge, the leading edge composed of a first material having a low coefficient of friction, the ball portion including a trailing edge and a neck portion, the trailing edge and neck portion composed of a second material, the socket including a socket opening, the socket opening composed of the first material, the socket including a socket interior, the socket interior composed of the second material; and
   a first zipper slide support and a second zipper slide support, the first and second zipper slide supports interconnected with the ball portion and socket portion, respectively, a first body and a second body of the first and second zipper slide supports, respectively, composed of the second material, with a first slide section of the first zipper slide support composed of the first material, and a second slide second section of the second zipper slide support composed of the first material.

2. The zipper of claim 1 wherein the first and second materials are co-extruded.

3. The zipper of claim 1, further comprising:
   a first and second flange portion, the first and second flange portions interconnected with the first and second zipper slide supports, respectively, the first and second flange portions composed of a third material.

4. The zipper of claim 3 wherein the durometer of the second material is higher than the durometer of the first and third materials.

5. The zipper of claim 4 wherein the durometer of the first material is higher than the durometer of the third material.

6. The zipper of claim 5 wherein the first, second, and third materials are Thermoplastic Urethane.

7. The zipper of claim 6 wherein the first material has a durometer of 74 shore D.

8. The zipper of claim 6 wherein the second material has a durometer of 95 shore A.

9. The zipper of claim 6 wherein the third material has a durometer of 75 shore A.

10. The zipper of claim 6 wherein the first, second, and third materials are extruded together as part of a tri-extrusion process; and the first, second, and third materials bond together during the extrusion process as a result of being composed of the sample same base thermoplastic.

11. The zipper of claim 3, further comprising:
    a slide, the slide oriented on the first and second zipper slide supports, the slide operable to close the zipper.

* * * * *